July 28, 1936. M. D. LIVINGSTON 2,049,125
VEGETABLE AND FRUIT DICER
Filed Feb. 3, 1936 3 Sheets-Sheet 2
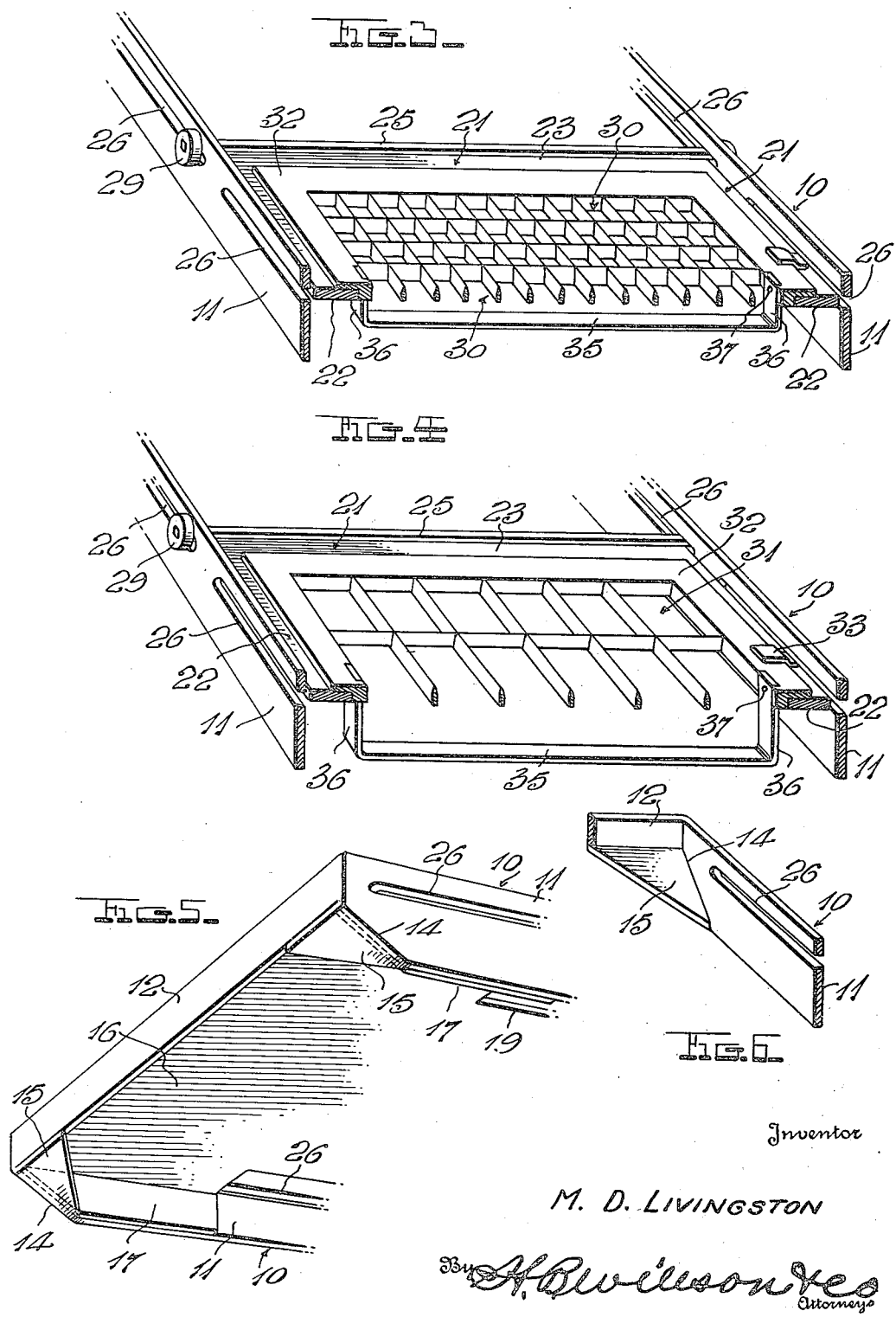
Inventor
M. D. LIVINGSTON

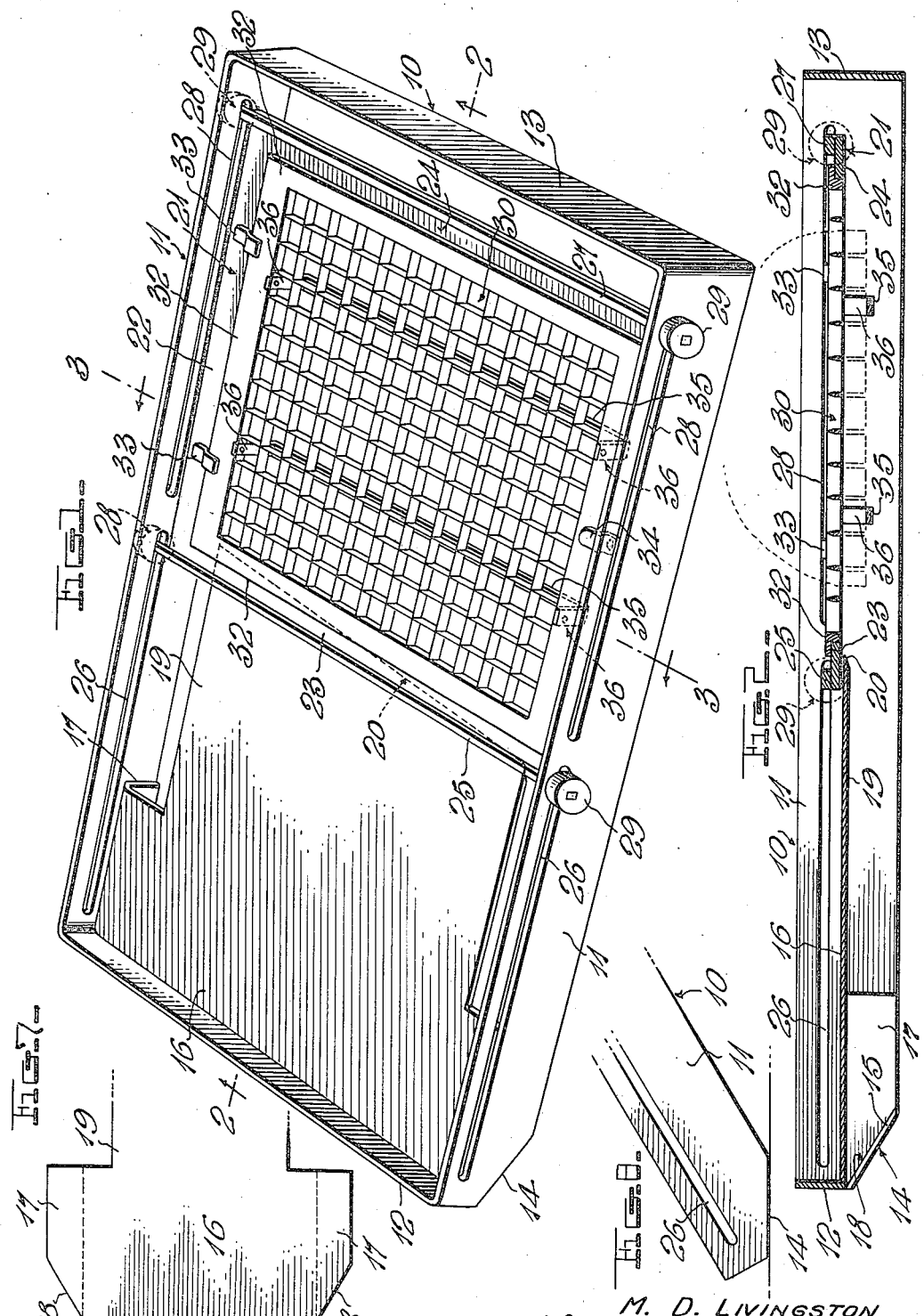

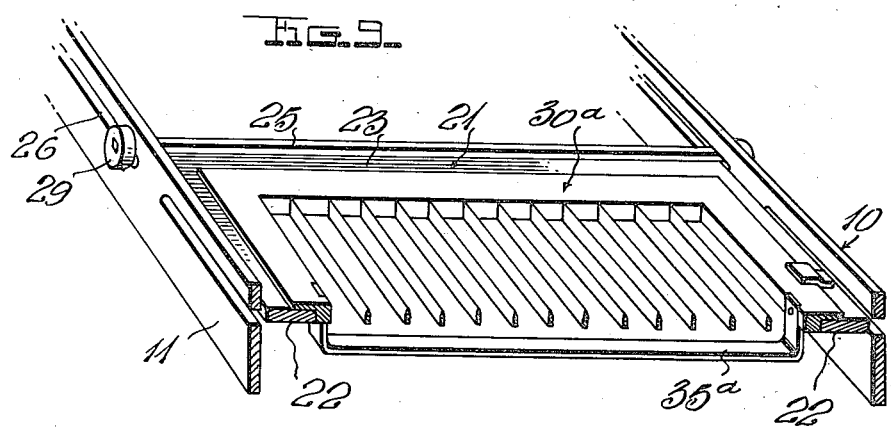
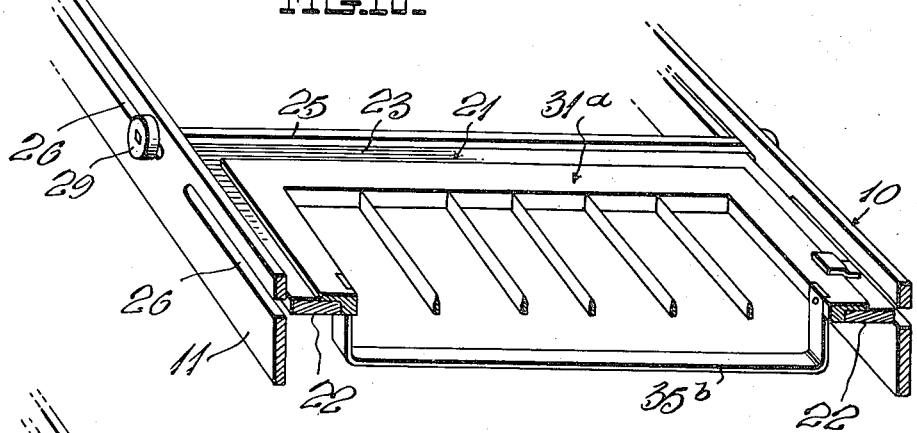
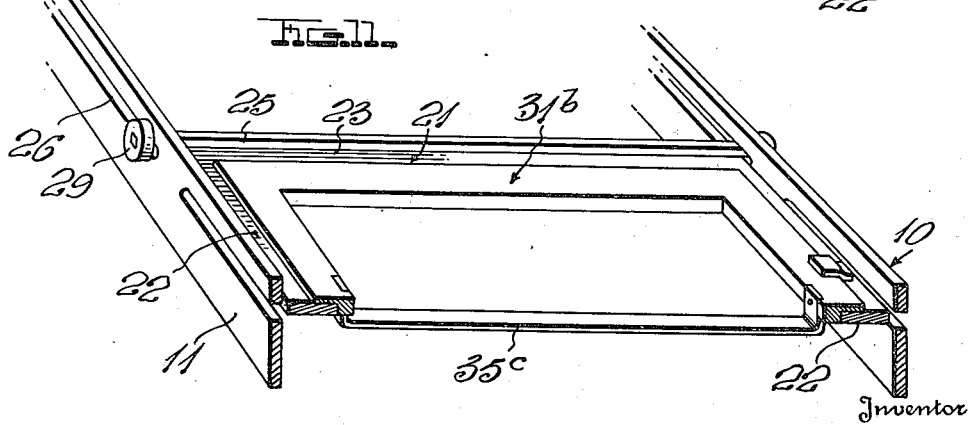

Patented July 28, 1936

2,049,125

UNITED STATES PATENT OFFICE 2,049,125

VEGETABLE AND FRUIT DICER

Mayre Daily Livingston, Oxnard, Calif.

Application February 3, 1936, Serial No. 62,194

4 Claims. (Cl. 146—168)

The invention aims to provide a new and improved device for dicing vegetables or fruit, or for cutting the same into strips or slices.

In carrying out the above end, a further object is to provide a novel construction enabling cutting of cubes, strips or slices in any of a number of sizes or thicknesses.

Yet another object is to provide a construction which will be simple and inexpensive, easily operable, efficient, strong and durable.

With the foregoing in view, the invention resides in the novel subject matter hereinafter described and claimed, description being accomplished by reference to the accompanying drawings.

Fig. 1 is a perspective view showing the device conditioned for cutting the fruit or vegetables into cubes.

Fig. 2 is a longitudinal sectional view on line 2—2 of Fig. 1.

Fig. 3 is a sectional transverse perspective view on line 3—3 of Fig. 1.

Fig. 4 is a view similar to Fig. 3 but showing a different cutter for cutting the vegetables or fruit into larger cubes.

Fig. 5 is a fragmentary perspective view showing the lower side of the front end portion of the device.

Fig. 6 is a detail sectional perspective view showing part of the front end portion of the main frame.

Fig. 7 is a fragmentary plan view showing a portion of the blade before downward bending of its attaching flanges.

Fig. 8 is a fragmentary side elevation showing the inclined position in which the device is ordinarily used.

Figs. 9 and 10 are detail sectional perspective views showing cutters used to condition the device for cutting the fruits or vegetables into strips.

Fig. 11 is a detail sectional perspective view showing an attachment which is used when slices rather than cubes or strips, are to be cut.

Preferred features of construction have been illustrated and will be specifically described, with the understanding, however, that within the scope of the invention as claimed, variations may be made.

A main rectangular frame 10 is provided, said frame having parallel longitudinal side bars 11, a front end bar 12 and a rear end bar 13, said side and end bars being secured together integrally or in any preferred manner. The front end bar 12 preferably is of less vertical width than the side bars 11, and the lower front corner portions of these side bars are bent inwardly on inclined lines 14 to provide combined corner braces for the frame and rests to lie upon a support when the device is held in the inclined position of Fig. 8, for use, said combined corner braces and rests being shown at 15, and being soldered or otherwise secured to the lower edge of the front end bar 12.

A longitudinal fixed blade 16 is disposed in a plane parallel with the upper edge of the frame 10, said blade abutting the front end bar 12 and having downwardly bent flanges 17 which are soldered or otherwise secured to the inner sides of the side bars 11, at the front ends of the latter. These flanges 17 are formed with inclined edge portions 18 which abut the upper sides of the combined corner braces and rests 15, providing a strong effectively reinforced structure for securely anchoring the blades 16 and for rigidly stiffening and reinforcing the front corners of the main frame 10.

The portion of the blade 16 provided with the flanges 17 is wider than the remainder of said blade, which remainder is denoted at 19. This blade portion 19 projects rearwardly with its longitudinal edges spaced inwardly from the side bars 11, and is provided with a rear cutting edge 20 preferably somewhat oblique to the frame 10.

A rectangular carriage frame 21 is disposed between the side bars 11 and is slidably connected with these side bars for reciprocation. The frame 21 comprises longitudinal side bars 22 connected by front and rear bars 23 and 24, all of said bars being preferably connected integrally with each other. In the present showing, a front transverse rod 25 is secured upon the front bar 23 of the frame 21 and projects laterally beyond said frame into a front pair of longitudinal slots 26 formed in the side bars 11 of the frame 10. Similarly, a rear transverse rod 27 is secured upon the rear bar 24 of the frame 21 and projects into rear slots 28 in the side bars 11, the frame 21 being thus effectively mounted for reciprocation. Preferably, washers or the like 29 are secured upon the ends of the rods 25 and 27 and lie slidably against the outer sides of the side bars 11, holding these side bars against any tendency to spring outwardly, inward springing of said bars being prevented by contact with the side bars 22 of the frame 21.

Any one of a number of grating-like dicing cutters may be removably connected with the frame 21, the cutting portions of one cutter being spaced for use when finely dicing fruit or vegetables, the cutting portions of another cutter being more widely spaced for more coarsely dicing the fruit or vegetables, etc. A cutter for fine dicing is shown at 30 in a number of the views and one for coarse dicing is illustrated at 31 in Fig. 4. Each one of these cutters is provided with a border frame 32 which rests partially within and partially upon the carriage frame 21 as seen in Figs. 2, 3 and 4, and provision is made for detachably securing the cutter to said frame 21. In the present disclosure, one side bar 22 of the frame 21 carries two fingers 33 to overlie one side of the frame 32, and the other side bar 22 is provided with a turn button or the like 34 to overlie the opposite side of said frame 32. By releasing the button 34, one cutter (30 for instance) may be readily removed and another cutter (cutter 31 for instance) may be easily engaged with the carriage frame 21.

A vegetable or piece of fruit to be diced is pushed downwardly against and partially through the cutter 30 or 31 and the carriage frame 21 is then pushed forwardly so that the combined actions of the cutter 30 or 31 and the blade 16, cut the fruit or vegetable into cubes. When the carriage frame 21 is retracted, the vegetable or fruit is pushed down again and said frame 21 is again pushed forwardly, these operations being repeated as often as necessary.

I provide gauge bars 35 to abut the vegetable or fruit and limit the downward pushing thereof through the cutter 30 or 31. These gauge bars extend transversely under the cutter and their ends are provided with upwardly projecting attaching arms 36 which are suitably secured at 37 to the border frame 32 of the cutter. The gauge bars 35 for the cutter 30 intended to cut the fruit or vegetables into relatively small cubes, are relatively close to said cutter, whereas the gauge bars 35 for the comparatively coarse cutter 31 are downwardly spaced a greater distance from the plane of the cutter. Whenever one cutter is removed from the carriage frame 21, its gauge bars 35 are removed unitarily with said cutter, the bars and cutter being permanently secured together. When another cutter is connected with the frame 21, it carries its respective gauge bars 35 properly located with respect to the cutting portions for cutting cubes of the proper size. As the carriage frame 21 is pushed forwardly, the gauge bars 35 pass under the blade 16, 19, the attaching arms 36 of said gauge bars pass between the blade portion 19 and the side bars 11 of the frame 10, and said frame 21 and the cutter 30 or 31 pass over the blade.

The device may either be placed horizontally upon a bowl, pan or the like and operated, or it may be held in an inclined position such as that shown in Fig. 8. It may be easily held with one hand and operated with the other, the latter being not only used to reciprocate the carriage frame 21 but to depress the vegetable or fruit to the limit allowed by the gauge bars 35, after each return stroke of said carriage frame.

If it be desired to cut the fruit or vegetables into strips instead of cubes, grating-like cutters such as those shown in Figs. 9 and 10 may be used, cutter 30ª being intended for cutting the fruit or vegetables into relatively fine strips and having a gauge bar 35ª, while cutter 31ª and gauge bar 35ᵇ are intended for cutting relatively coarse strips.

If only slicing is to be done, a frame such as 31ᵇ of Fig. 11 may be used, said frame having a gauge bar 35ᶜ which dictates the thickness of the slices. Other frames having gauge bars properly set for slices of other thicknesses may also be used.

By employing the novel construction shown and described, excellent results are attainable but it is to be understood that the present disclosure is illustrative rather than limiting.

I claim:—

1. A device of the class described comprising a main frame, a carriage frame slidably connected with said main frame for reciprocation along the same, a transverse gauge bar under said carriage frame to abut a vegetable or the like and limit the extent which it may project below said carriage frame, said gauge bar being unitarily movable with said carriage frame and having upwardly projecting attaching arms at its ends, and a fixed longitudinal blade secured at its front end to the front portion of said main frame, said blade having a rearwardly projecting portion disposed in a plane for reception between said carriage frame and said gauge bar when said carriage frame is pushed forwardly, said rearwardly projecting portion of said blade being sufficiently narrow for reception between said upwardly projecting attaching arms of said gauge bar when said carriage frame is pushed forwardly.

2. A device of the class described comprising a main frame, a carriage frame slidably connected with said main frame for reciprocation along the same, a detachable frame engaged with said carriage frame, releasable means securing said detachable frame to said carriage frame, a transverse gauge bar under said detachable frame to abut a vegetable or the like and limit the extent which it may project below said detachable frame, said gauge bar having upwardly projecting attaching arms at its ends secured to said detachable frame, whereby said detachable frame and gauge bar are unitarily removable from said carriage frame, and a fixed longitudinal blade secured at its front portion to the front portion of said main frame, said blade having a rearwardly projecting portion disposed in a plane for reception between said detachable frame and said gauge bar when said carriage frame is pushed forwardly, said rearwardly projecting portion of said blade being sufficiently narrow for reception between said upwardly projecting attaching arms of said gauge bar when said carriage frame is pushed forwardly.

3. In a device of the class described, a main frame having parallel side bars and a front end bar joined to the front ends of said side bars, said side bars being of greater vertical width than said end bar and having their front lower corner portions bent inwardly on inclined lines and secured to the lower edge of said end bar, providing combined corner braces for the frame and rests to lie upon a support when the frame is held in inclined position for use.

4. A structure as specified in claim 3; together with a blade between the front end portions of said side bars and abutting said end bar, said blade having downwardly bent flanges secured against the inner sides of said side bars, said flanges being provided with inclined lower edge portions abutting the upper sides of said combined corner braces and rests.

MAYRE DAILY LIVINGSTON.